United States Patent [19]

Kijesky

[11] 3,916,533
[45] Nov. 4, 1975

[54] CIRCULAR ARRAY HYDROPHONE SIMULATOR

[75] Inventor: Michael M. Kijesky, Warminster, Pa.

[73] Assignee: The United States of America as represented by the Secretary of the Navy, Washington, D.C.

[22] Filed: May 2, 1974

[21] Appl. No.: 466,118

[52] U.S. Cl. .................................................. 35/10.4
[51] Int. Cl.² .......................................... G09B 9/00
[58] Field of Search ................... 340/3 A, 5 C, 5 R; 35/10.4

[56] References Cited
UNITED STATES PATENTS

| | | | |
|---|---|---|---|
| 3,363,045 | 1/1968 | Pommerening | 35/10.4 |
| 3,479,439 | 11/1969 | Kaufman et al. | 35/10.4 |
| 3,484,738 | 12/1969 | Autrey | 340/5 R |

Primary Examiner—Richard A. Farley
Attorney, Agent, or Firm—R. S. Sciascia; Henry Hansen

[57] ABSTRACT

A device for simulating time delayed outputs resulting from impingement of a point source of sonic energy upon a nonlinear array of hydrophones. An acoustic signal generator provides an analog output signal to a pulse forming circuit which converts the analog signal to a series pulse train which is fed to a shift register clocked at a rate in accordance with the time delays between the hydrophones. Selected outputs from the register are reconverted to analog signals by individual wave forming circuits assigned to each of the shift register outputs. A plurality of noise generators provide noise signal outputs which are independently added to the reconverted analog signals to form a plurality of selectively delayed signals simulative of hydrophone outputs having both signal and noise components, the delays being variable to simulate different angles of sonic energy approach by selection of appropriate shift register outputs.

7 Claims, 2 Drawing Figures

CIRCULAR ARRAY HYDROPHONE SIMULATOR

BACKGROUND OF THE INVENTION

The present invention relates generally to sonar equipment comprising a nonlinear array of hydrophones and, in particular, to means for simulating the time delayed output of each hydrophone within the array. The direction detecting ability of such equipment depends upon the time delays between impingement of a sonic energy wavefront upon the individual hydrophones within the array.

The simulated outputs of the nonlinear hydrophone array can be connected to the input of a beam forming network which operates on the hydrophone outputs to provide an indication of the direction from which the sonic energy point source emmanates. The desirability of a device for simulating the outputs representative of a nonlinear hydrophone array becomes apparent because of the obvious problems and limitations inherent in the use of actual hydrophone arrays in an ocean environment. The application of electronic equipment used for simulating progressively delayed outputs representative of a linear hydrophone array is well known in the art and particularly pointed out in U.S. Pat. No. 3,484,738 to Autrey, issued Dec. 16, 1969. The prior art, however, does not teach structure to resolve the more complex situation of simulating the outputs from a nonlinear hydrophone array.

SUMMARY OF THE INVENTION

Accordingly, it is an object of the present invention to provide apparatus for achieving predetermined time delays of a generated, acoustic signal so as to provide a plurality of simulated nonlinear array hydrophone outputs which outputs can be applied to a beam forming network for use in the testing of sonar equipment.

Another object of the present invention is to provide a nonlinear array hydrophone output device which will simulate the arrival of a sonic energy wave front for any predetermined direction utilizing a minimum of equipment and space.

Yet another object of the present invention is to more truly simulate the delayed outputs from the nonlinear array by the addition of respective noise signals to each of the selected hydrophone outputs.

Still another object of the present invention is to accomplish the simulation of outputs resulting from the impingement of sonic energy on a nonlinear array of hydrophones from preselected directions through the provision of a multiple tap shift register means for providing outputs at preselected delay times indicative of the positions of each of the hydrophones within the nonlinear array relative to the energy point source, the simulated direction of approach of the sonic energy being changeable by changing the output taps of the shift register.

DESCRIPTION OF THE PREFERRED EMBODIMENT

Figure 1:
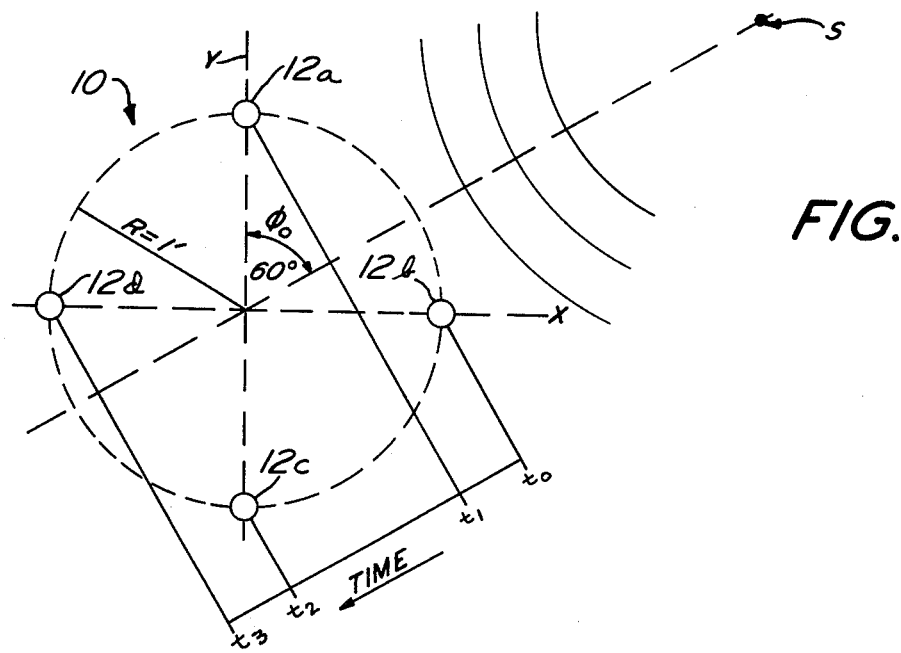
FIG. 1 is an example of a nonlinear array having four equally spaced hydrophones configured in a circle for simulation by the present invention.

Referring now to FIG. 1, there is shown a circular hydrophone array 10, which is one example of an nonlinear array configuration, having four hydrophones 12$a$–12$d$ spaced equally about the circumference of the array 10. For purposes of explanation and by way of example the array 10 is placed within a coordinate system having a vertical axis Y and a horizontal axis X which intersect at the center of the array. Accordingly, the array 10 lies in the X–Y plane and, when viewed in three-dimensional space, has a polar axis Z (not shown) normal to the X–Y plane and which goes through the center of the array 10. For simplicity in the embodiment of FIG. 1, a sonic energy point source S has been placed within the plane of the array 10 and external to the circle. Of course, the source S can be placed at any position with respect to the nonlinear array to simulate differing approach directions for an acoustic wave front. Accordingly, an angle $\theta$ (not shown), which is the angle formed between the polar axis Z and the point source S in this example, is 90°. For purposes of calculations to be described later and further identification of elements within the array 10, the hydrophones 12$a$–12$d$ will be considered according to the alphabetical order of the postscripts. The position of the energy source S is identified in this example as being at an angle $\theta = 90°$ and at an angle $\phi_o = 60°$, the angle $\phi_o$ being measured from a first line drawn between the center of the array 10 and the first considered hydrophone 12$a$ and a second line drawn from the center of the circle to the point source S. Accordingly, it may be seen from the geometry of the example shown in FIG. 1 that the acoustic wave front generated by the point source S will impinge upon the array 10 by first coming in contact with hydrophone 12$b$ and then hydrophones 12$a$, 12$c$, and 12$d$ in order. The particular time at which each hydrophone will be impinged upon by the wavefront generated by the source S is illustrated by drawing individual lines beginning at each hydrophone position which orthogonally intersect with the bearing of the point source S relative to the center of the array 10. Accordingly, the intersection of the acoustic wave front with an initial impingement upon hydrophone 12$b$ occurs at time $t_o$. Hydrophones 12$a$, 12$c$ and 12$d$ are sequentially impinged upon by the acoustic wave front at times $t_1$, $t_2$ and $t_3$, respectively.

Figure 2:
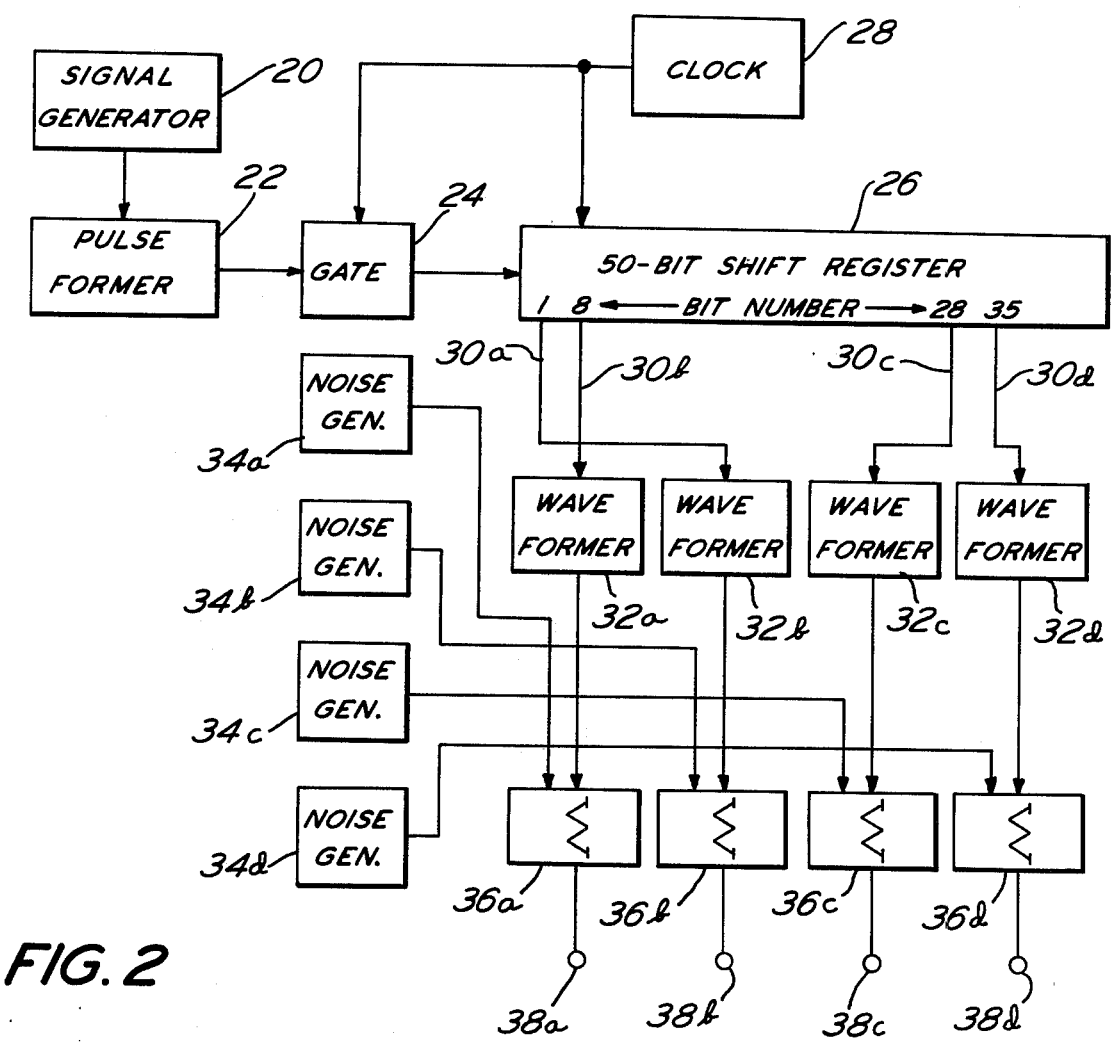
FIG. 2 is a block diagram of the invention.

Referring now to FIG. 2 there is shown a block diagram of the present invention. An acoustic signal generator 20 provides an output which is connected to the input of a pulse former 22 whose output is applied to the input of a fifty bit shift register 26 through a gate 24. A clock 28 provides simultaneous outputs to the enable input of the gate 24 and to the clock input of the register 26. The shift register 26 provides 50 outputs of which only four are shown (bit numbers 1, 8, 28, 35) and the particular selection of which will later be explained. Corresponding to the output bit numbers 1, 8, 28, and 35 are shift register output lines 30$a$, 30$b$, 30$c$, and 30$d$, respectively. Each of the output lines 30$a$–30$d$ is respectively connected to inputs of wave formers 32$a$–32$d$, the outputs of which are respectively connected to one input of respective summing circuits 36$a$–36$d$. Noise generators 34$a$–34$d$ are respectively connected to second inputs of the summing circuits 36$a$–36$d$ whose respective individual outputs are shown at terminals 38$a$–38$d$.

Referring to FIG. 1, the initial calculations for the operation of the invention will now be explained. The initial conditions for the circular array output simulator are created by preselecting the number of hydrophone elements within the nonlinear array and, in the circular case, the radius of that array. A simulated direction for the point source S of acoustic energy is also chosen relative to the array. In the example shown in FIG. 1, the circular array that is to be simulated contains four hydrophones 12a–12d which, for purposes of simple illustration define a plane that includes the energy source S. The polar axis Z provides a basis for polar coordination of the array. Accordingly, the source S lies at a polar angle of $\theta = 90°$ from the polar axis Z, if viewed in three-dimensional space. Hydrophone 12a is arbitrarily chosen to be the first element within the array and is conveniently placed on the vertical axis Y. The energy source S, being within the plane of the array, is chosen in this example to be positioned at an azimuthal angle $\phi_o = 60°$ as measured from a radius extending to the first hydrophone 12a. Obviously, the number of hydrophone elements within the array, the radius, and the relative position of the energy source S may all be individually selected so as to encompass a wide variety of sonar conditions suitable for simulation. The energy source S, for example, need only be defined as having a polar angle $\theta$ relative to the polar axis Z and the azimuthal angle $\phi_o$ relative to the arbitrarily chosen first hydrophone element within the array. Also illustrated in FIG. 1 is a series of sonic energy wave fronts which are generated by the energy source S and directed towards the center of the circular array 10. The energy source S generates sonic energy within the acoustic frequency range and, in this example, has arbitrarily been chosen to be 100 Hertz.

Given the foregoing initial conditions, the linear phase displacement $P_d$ of each hydrophone within the circular array 10 relative to the position of the energy source S can be calculated according to the equation:

$$P_d = R \text{ SIN } \theta \text{ COS } (\phi_o - \phi_n)$$

wherein: $R$ = the radius of the circle in feet, $\theta$ = the polar angle; and $\phi_n$ = the angle measured from the first hydrophone element to $n$th hydrophone element with the array.

Since both the angles $\theta$ and $\phi$ are considered in the phase relationship for the circular array, a beam former used in conjunction with the invention is capable of forming a beam which is selective in both the azimuthal and polar directions. Utilizing the foregoing formula, the phase displacement of the first hydrophone 12a relative to the energy source S is easily calculated to be 0.5 feet. This distance is representative of the difference between a line drawn from the first hydrophone 12a normal to the direction of the energy source S (and shown in FIG. 1 as that line delineating $t_1$), and the center of the circular array. Assuming that the velocity of sound in water is approximately 5000 feet per second, the time required $T_o$ for the energy source wave front to travel from the first hydrophone 12a to the center of the array is easily calculated to be 0.1 millisecond (ms.). Similarly, the required times $T_1$, $T_2$, $T_3$ for the wave front to travel, respectively, between hydrophones 12b, 12c, 12d and the center of the circular array are calculated to be 0.17 ms., 0.1 ms. and 0.17 ms. The wave front time delays between progressively impinged hydrophones within the array may now be calculated by noting the time differences between the successively impinged hydrophones. For example, the time $t_1$ at which the wave front impinges upon hydrophone 12a relative to the time $t_o$ at which the wave front first impinges upon the hydrophone 12b equals $T_1 - T_o = 0.07$ milliseconds. Accordingly, if the convention is adopted that hydrophone 12b is first impinged upon at $t_o = 0$, hydrophone 12a will be impinged upon by the wave front at $t_1 = 0.07$ milliseconds later. The next hydrophone 12c to be activated by the wave front is impinged relative to the hydrophone 12b at $t_2 = T_2 + T_1 = 0.27$ milliseconds. Similarly, the output of hydrophone 12d is activated relative to hydrophone 12b at $t_3 = T_3 + T_1 = 0.34$ milliseconds. Therefore, the time $t_3$ necessary for the wave front to traverse the first and last impinged elements within the array i.e., hydrophones 12 b and 12d, respectively, is 0.34 ms.

Other nonlinear hydrophone arrays configurations such as, for example, volumetric designs may also be simulated in light of the foregoing teachings by appropriate mathematical implementation corresponding to the geometry of the array to be simulated with respect to the position of a sonic energy point source. That is, the differing arrival times of a sonic energy wave front with respect to individual hydrophones within the nonlinear array may be ascertained by calculating the respective phase displacement distances between each of hydrophones relative to the point source position.

Referring now to FIG. 2, the signal generator 20 generates an acoustic signal of approximately 100 hertz which is connected to a conventional pulse former 22 which, for example, may comprise clipping circuitry which converts the incoming analog acoustic signal to a series pulse train having a digital format. The clock 28 provides a series of high frequency pulses having a frequency, for example, of 100 Kilohertz simultaneously to the enable input of a gate 24 and a clock input of a shift register 26. The frequency of the clock 28 and the number of bits within the register 26 are predetermined so that when interacting with one another the shift register 26 is clocked at a rate consistent with the desired resolution of the simulated delay times between the hydrophone outputs, and the number of bits within the register is sufficient to handle the maximum delay time between the first and last activated hydrophones within the array. Accordingly, within the present embodiment having a maximum delay time of 0.34 milliseconds, an appropriate delay time resolution element would be 0.01 milliseconds per register bit. The choice of a maximum delay time resolution element, and, correspondingly, the minimum clocking frequency, is most easily determined by noting the greatest common denominator for the delay times between the progressively impinged hydrophones. In the present example, the sequential delay times are $t_o = 0$, $t_1 = 0.07$ ms., $t_2 = 0.27$ ms. and $t_3 = 0.34$ ms. Therefore, by selecting a delay time resolution element of 0.01 ms. per register bit, it is assured that all of the hydrophone outputs can be accurately simulated in time and be represented by a particular register bit output. In order that each bit within the register 26 be progressively shifted every 0.01 milliseconds, the clock 28 will therefore have a frequency of 100 Kilohertz. The number of bits required in the shift register to adequately represent a total delay time of 0.34 milliseconds with a shifting rate of 0.01 milliseconds per bit is 35. A conventional 50 bit serial shift register 26 was chosen inasmuch as this bit capacity is readily available. Of course, greater bit capacities and clocking frequencies may be used in order to increase the resolution of the time delay elements if so desired. Once the clocking frequency is determined, the minimum number of bits required in the shift register may be calculated by adding one bit to the product of the clock frequency and the time required for the wave front to traverse between the first and last impinged hydrophones. In the present example, the minimum number of bits required $N_{min.} = 1 + [ (100 \times 10^3) (0.34 \times 10^{-3}) ] = 35$. Alternatively, the minimum number of bits may be calculated by adding one bit to the quotient of the time between the first and last impinged hydrophones and the maximum delay time resolution element. The gate 24 is therefore enabled by the clock 28 at a 100 Kilohertz rate and passes the pulse train from the pulse former 22 to the serial input of the 50 bit shift register 26. The shift register 26 provides 50 parallel bit outputs of which only four are shown. Particular outputs of the register 26 are selectively chosen to simulate time delays between the various hydrophones within the array 10. For example, bit number 1 output having an output line 30a corresponds to the time activation of hydrophone 12a. Similarly, output bit numbers 8, 28, and 35 having output lines 30b, 30c, 30d represent sonar activity from hydrophones 12b, 12c, and 12d, respectively. A conventional wave former 32b comprising, for example, a low pass filter, is connected to receive an output signal from the first bit position within the shift register 26 corresponding to the first hydrophone 12b to be activated by the energy source S. Similarly, 0.07 milliseconds or 7 bit positions later, an output signal from bit number 8 of the register 26 is connected to the input of wave former 32a corresponding to the next activated hydrophone 12a within the array. A wave former 32c is connected to receive an output signal 0.27 milliseconds or 27 bit positions later than the output signal produced at bit output position number 1. Accordingly, the register 26 is selectively tapped at output bit number 28 to provide a digitized output corresponding to the next succeedingly activated hydrophone 12c. Lastly, 0.34 milliseconds or 34 bit positions from bit number 1 output, the register 26 is selectively tapped at bit number 35 output to form an input to wave former 32d corresponding to the last activated hydrophone 12d. Each of the wave formers 32a–32d operates to reconstitute the digital output from the shift register into an analog representation of the original acoustic signal. Of course, the individual outputs of the wave formers are now selectively delayed in time to represent the progressive activation of the hydrophones 12a–12d by the energy source S. Conventional summing circuits 36a–36d such as, for example, linear frequency mixers are connected to receive the reconstituted analog signals from respective wave formers 32a–32d. Noise generators 34a–34d generate random noise simulative of noise found within an ocean environment and provide individual noise output signals which are connected respectively to inputs of the summing circuits 36a–36d. Each of the summers 36a–36d independently mixes the reconstituted acoustic signal from the output of the wave formers 32a–32d with the noise generated by the generators 34a–34d and provides outputs having both signals and noise components simulative of an ocean environment at respective output terminals 38a–38d.

Thus it may be seen that it has been provided a novel device for simulating delayed outputs from a circular array of hydrophones for any wave front direction.

Obviously many modifications and variations of the invention are possible in light of the above teachings. It is therefore to be understood that within the scope of the appended claims the invention may be practiced otherwise than as specifically described.

What is claimed is:

1. Apparatus for simulating the progressively delayed outputs resulting from impingement of sonic energy having a point source on a nonlinear array of hydrophones, comprising:
    signal generating means for providing an analog output signal having a frequency simulative of the point source;
    pulse forming means connected to receive said analog output signal for converting the analog output signal into a digital pulse train output signal;
    clock means for providing clock pulses at predetermined equal intervals;
    delay means connected to receive said clock pulses and said digital pulse train output signal for providing a plurality of outputs each representative of the pulse train but serially delayed by one interval; and
    a plurality of wave forming means corresponding to the number of hydrophones in the nonlinear array respectively connected to receive preselected ones of said delay means outputs for converting said delay means outputs to analog output signals, said preselected ones of delay means outputs corresponding to the predicted impingement times of the sonic energy at the respective hydrophones;
    a plurality of noise generating means for producing random noise output signals simulative of a water body; and
    a plurality of summing means having a first input connected to receive respective ones of said noise generating means outputs signals and a second input connected to receive respective ones of said wave forming means analog output signals for respectively summing the noise and analog signals to form output signals simulative of individual hydrophone outputs within said nonlinear array.

2. Apparatus according to claim 1 wherein the maximum value of respective ones of the equal pulse intervals is equal to the greatest common denominator relative to the time delays betwen said hydrophone outputs.

3. Apparatus according to claim 2 wherein the minimum number of said delay means outputs is equal to one plus the quotient of the time difference between the first and last impinged hydrophones within the nonlinear array, and the maximum pulse interval.

4. Apparatus according to claim 3 wherein said delay means further comprises:
    gating means connected to receive said digital pulse train and said clock pulses for gating said pulse train upon the occurrence of respective ones of said clock pulses and for providing an output thereof; and
    multiple tap shift register means connected to receive said gating means output and said clock pulses for repetitively shifting said gating means output according to said clock pulses and for providing said delay means outputs.

5. Apparatus according to claim 4 wherein said pulse forming means comprises a clipping circuit.

6. Apparatus according to claim 5 wherein each of said wave forming means comprises a low pass filter.

7. Apparatus according to claim 6 wherein each of said summing means comprises a linear frequency mixer.

* * * * *